(12) United States Patent
Marengo

(10) Patent No.: US 8,393,648 B2
(45) Date of Patent: Mar. 12, 2013

(54) COMPOSITE FLANGE, DUCT INCORPORATING A FLANGE AND METHOD OF MAKING A FLANGE

(75) Inventor: Giovanni Antonio Marengo, East Cowes (GB)

(73) Assignee: GKN Aerospace Services Limited, Isle of Wight (GB)

( * ) Notice: Subject to any disclaimer, the term of this patent is extended or adjusted under 35 U.S.C. 154(b) by 277 days.

(21) Appl. No.: 12/663,084

(22) PCT Filed: Jun. 3, 2008

(86) PCT No.: PCT/GB2008/001892
§ 371 (c)(1), (2), (4) Date: May 27, 2010

(87) PCT Pub. No.: WO2008/149079
PCT Pub. Date: Dec. 11, 2008

(65) Prior Publication Data
US 2011/0254267 A1 Oct. 20, 2011

(30) Foreign Application Priority Data
Jun. 7, 2007 (GB) .................................. 0710966.3

(51) Int. Cl.
*F16L 47/00* (2006.01)
(52) U.S. Cl. ...................... 285/290.1; 156/172; 244/120; 264/221; 425/438
(58) Field of Classification Search .............. 285/290.1, 285/290.2, 290.3, 285.1; 244/120, 119; 156/187, 156/172, 218; 264/516, 221; 425/436 R, 425/438
See application file for complete search history.

(56) References Cited

U.S. PATENT DOCUMENTS

| | | | | |
|---|---|---|---|---|
| 4,038,118 A | * | 7/1977 | James | 156/182 |
| 4,205,927 A | | 6/1980 | Simmons | |
| 4,596,621 A | * | 6/1986 | Nawaz | 156/245 |
| 4,693,678 A | * | 9/1987 | Von Volkli | 425/405.1 |
| 4,826,106 A | * | 5/1989 | Anderson | 244/117 R |
| 4,830,096 A | * | 5/1989 | Biagini | 165/41 |

(Continued)

FOREIGN PATENT DOCUMENTS

| | | |
|---|---|---|
| DE | 3933766 | 6/1990 |
| DE | 4419993 A1 | 12/1995 |

(Continued)

OTHER PUBLICATIONS

The International Search Report and Written Opinion as mailed on Dec. 1, 2008 for International Patent Application PCT/GB2008/001892.

(Continued)

*Primary Examiner* — David E Bochna
(74) *Attorney, Agent, or Firm* — Quarles & Brady LLP

(57) ABSTRACT

A flange (1) made of composite material, a method of making the flange (1) and a mandrel (3) upon which the flange (1) is formed are provided. The flange (1) is a curved hollow member that has a substantially triangular cross-section. The method of making the flange (1) includes applying composite material to external surfaces of a curved mandrel (3). The mandrel (3) is curved and comprises a solid triangular cross-section. The method also includes curing the composite material to produce a flange (1) that is a curved hollow member that is substantially triangular in cross-section.

35 Claims, 12 Drawing Sheets

U.S. PATENT DOCUMENTS

| | | | |
|---|---|---|---|
| 5,239,822 A | | 8/1993 | Buchacher |
| 5,415,463 A | | 5/1995 | Olson et al. |
| 5,571,357 A | | 11/1996 | Darrieux et al. |
| 5,683,646 A | * | 11/1997 | Reiling, Jr. .................... 264/512 |
| 6,179,943 B1 | * | 1/2001 | Welch et al. .................. 156/160 |
| 6,231,006 B1 | * | 5/2001 | Gruensfelder et al. ..... 244/53 B |
| 6,260,567 B1 | * | 7/2001 | Gruensfelder et al. ........... 137/1 |
| 6,723,272 B2 | * | 4/2004 | Montague et al. ............ 264/510 |
| 7,413,694 B2 | * | 8/2008 | Waldrop et al. ............... 264/257 |
| 7,798,285 B2 | * | 9/2010 | Chiou et al. .................. 181/213 |
| 7,861,394 B2 | * | 1/2011 | Douglas et al. ................. 29/458 |
| 8,012,286 B2 | * | 9/2011 | Stubner et al. ................ 156/218 |
| 8,025,499 B2 | * | 9/2011 | Hubert et al. ................. 425/470 |
| 8,136,362 B2 | * | 3/2012 | Beutin et al. .................... 60/796 |

FOREIGN PATENT DOCUMENTS

| | | |
|---|---|---|
| EP | 1820578 A1 | 8/2007 |
| GB | 2238363 | 5/1991 |

OTHER PUBLICATIONS

The PCT Chapter II Demand and the Applicant's Amended Claims and Comments as mailed on Apr. 7, 2009 for International Patent Application PCT/GB2008/001892.

The International Preliminary Report on Patentability as mailed on Sep. 10, 2009 International Patent Application PCT/GB2008/001892.

\* cited by examiner

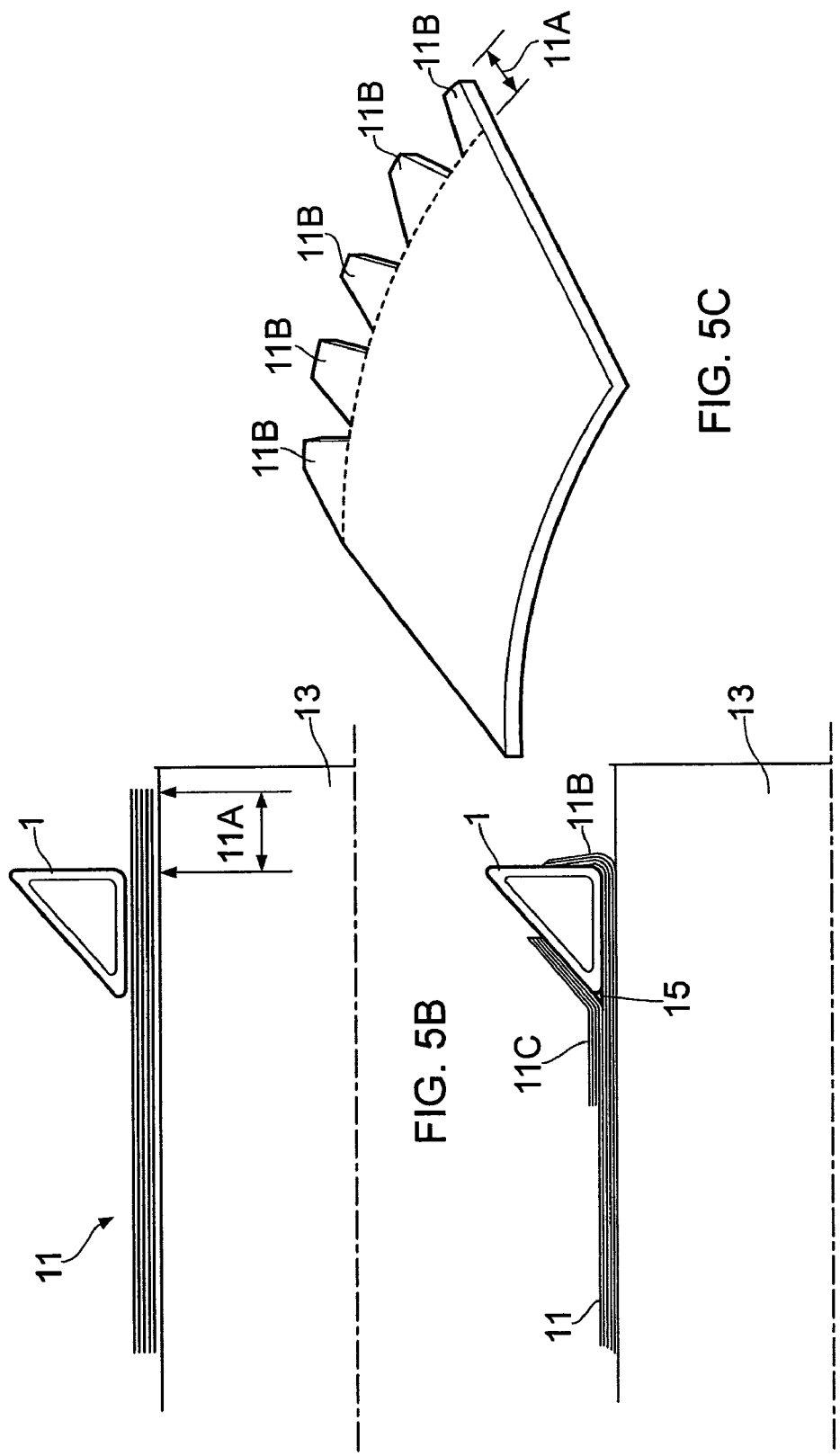

COMPOSITE FLANGE, DUCT INCORPORATING A FLANGE AND METHOD OF MAKING A FLANGE

CROSS-REFERENCE TO RELATED APPLICATIONS

This application claims priority to PCT International Application No. PCT/GB2008/001892 filed on Jun. 3, 2008, which claims priority to British Application No. GB 0710966.3 filed on Jun. 7, 2007, incorporated by reference herein.

FIELD

This invention relates to a flange made of composite material. In particular, the invention relates to a flange that is curved and has a substantially triangular cross-section and is made of composite material.

BACKGROUND

Conventionally flanges are included on, for example, metallic hollow structures such as pipes for joining two such structures together or for joining the hollow structure to surrounding structural elements. An example of a conventional flange, can be a disc shaped rim formed on the end of pipes and shafts for coupling them together In recent times composite materials have become an increasingly attractive alternative to metal for many aircraft components because composite materials offer improved properties such as lower weight, improved fatigue/damage resistance, corrosion resistance and negligible thermal expansion. In terms of manufacture, a flange that forms a disc shaped rim made from composite materials can be a very complex manufacturing process due to the uniformity of fibre alignment being important in the flange that is load bearing in application.

Due to the complexities in manufacturing a composite flange, aircraft components requiring such a configuration are commonly made from metal.

SUMMARY

A first aspect of the present invention provides a flange comprising composite material, wherein the flange comprises a curved hollow member having a substantially triangular cross-section.

In one embodiment, the flange has a triangular cross-section and is made from composite material provides a structure that can be attached to a composite structure such that it acts as an integral part of the structure. The triangular cross-section can provide a structure that is able to withstand axial offset load by efficiently transmitting the localized load into the structure. The triangular shaped flange allows composite structures to be joined together or to other surrounding structural elements in a similar manner to a flange in the form of a disc shaped rim.

The flange may have a cross-section that is a substantially right-angled triangle, wherein a first side of the triangle is defined by a curved surface of the flange and is attachable to a correspondingly curved structure and a second side is substantially perpendicular to the first side. The second side of the triangle that is perpendicular to the first side can be configured to project from the periphery of the structure to which it is attached to provide a surface for coupling two structures together.

The curved flange may define part of a closed figure, for example a circle or an ellipse. Two or more curved flange elements may be joined together to form a closed figure. Examples of a flange according to the invention may be joined to open structures such as channels or it may be joined to closed structures such as pipes.

In cross section, the triangular flange is a closed figure. Therefore, to facilitate connection of two components or structures together the flange may include access holes on a third side (a hypotenuse side) of the triangle such that the mounting side of the triangle that is effective in joining two components or structures together is accessible. In one embodiment the access holes are pentagonal-shaped such that each side of the pentagon can align with the fibre orientation in the laminated structure and the shape may have little or no effect on the integrity of the flange.

In an embodiment of the invention a flange is attached to a duct made of composite material. Therefore, the duct can be coupled to other ducts or other structural components. The duct, for example, an engine casing, may be made from the same composite material as the flange. Alternatively, the duct may be made of a different composite material than that of the flange. In an example embodiment, the duct and the flange are made of composite materials that are substantially thermally and chemically compatible.

The duct may be an open channel having a curved perimeter or it may be a closed figure having a curved perimeter, for example a circle or an ellipse. One or more flanges may be attached at one or both ends of the duct.

A second aspect of the present invention provides a method of making a flange comprising composite material, wherein the method comprises the steps of applying composite material to a curved mandrel that comprises a substantially triangular cross-section, and curing the composite material to produce a curved flange that is hollow and has a triangular cross-section.

The mandrel may remain in the hollow of the flange or it may be removable. For example, a lightweight foam mandrel may be used that can remain inside the hollow.

When the mandrel is removable the method of making the flange includes a further step of removing the mandrel. A foam mandrel may be soluble. Therefore, to remove a foam mandrel it is dissolved to remove it from the hollow flange.

Alternatively, a suitable mandrel may be dismantled for removal. The mandrel may comprise two or more parts joined together to provide a solid triangular body around which the composite material can be applied.

The method of making the flange may include attaching the flange to at least one end of a duct made of composite material. An end section of the material forming the duct may be darted such that sections are produced that can be folded against the side of the flange and attached to the side of the flange such that the two components are joined together. Darting the composite material minimises the risk of damage due to breakage or distortion of the fibres when the material is folded into contact with the flange.

At the junction of the vertex of the triangular cross-section provided by the surface of the flange in contact with the duct and the hypotenuse filler material may be applied to eliminate any void that may be present at the junction. The filler material may also be effective in reducing damage to the composite fibres due to kinking in the region of the junction of the vertex of the triangular cross-section provided by the surface of the flange in contact with the duct and the hypotenuse. To join the flange to the duct, part of the duct, the filler material and part of the hypotenuse may be over laid with plies of composite material.

The attachment of the flange to the duct may be further improved by applying a suitable adhesive to the curved side of the triangular cross-section, such that any gaps present at the interface of the triangular flange and the duct are filled.

The method of producing the flange and the duct further comprises the step of bagging and curing the whole structure such that the flange becomes an integral part of the duct.

In a laminated structure each layer may include aligned fibres. The laminated plastic providing the flange and duct may include layers wherein the fibres are orientated at 0 degrees, 90 degrees, +45 degrees and/or −45 degrees.

On the hypotenuse side of the triangular flange access holes may be machined following the curing step. The access holes allow access to the mounting surface of the flange; the mounting surface being the side of the flange that attaches one structure to another. The holes may be the shape of a pentagon such that the sides of the holes align with the fibres. A pentagonal shaped hole in a laminate structure comprising aligned fibres as described above should have little or no effect on the integrity of the composite material.

A further aspect of the present invention is directed to a mandrel for use in the method of making a flange according to the first aspect. The mandrel may be a solid component that is curved and has a triangular cross-section that corresponds with the flange shape.

The mandrel may comprise two or more parts joined together to provide the triangular cross-section. Advantageously, the parts making up the mandrel can be dismantled when inside the hollow of the flange such that they can be removed. In one embodiment the mandrel comprises two segments that have mitred surfaces, which slide relative to each other to separate for removal from the flange. Alternatively, the mandrel may comprise a number of tessellating pieces that join together to form the solid triangular cross-section and can be dismantled whilst inside the triangular flange for removal.

The mandrel may include one or more end plates that can be secured to the end of the pieces making up the triangular cross-section of the mandrel. The end plate(s) can be used to safeguard against the pieces of the mandrel moving relative to each other or separating during manufacture of the flange. Any movement of the mandrel during manufacture could result in discontinuities in the laminate making up the flange. Any discontinuities could adversely affect the strength and integrity of the flange in use.

A mandrel that can be dismantled may be made, for example, of metal, for example INVAR™. Preferably, the material properties of the mandrel should not be affected by the temperatures at which the flange is formed and cured.

For ease of removal of the mandrel from the flange, the mandrel may be coated with a release agent and/or the mandrel may be coated in a low friction material (e.g. PTFE).

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE DRAWINGS

Embodiments of the present invention will now be described, by way of example only, with reference to the accompanying drawings in which:

FIGS. 5B to 5F schematically represent the method of attaching a composite flange to a cylindrical structure;

Figure 1:
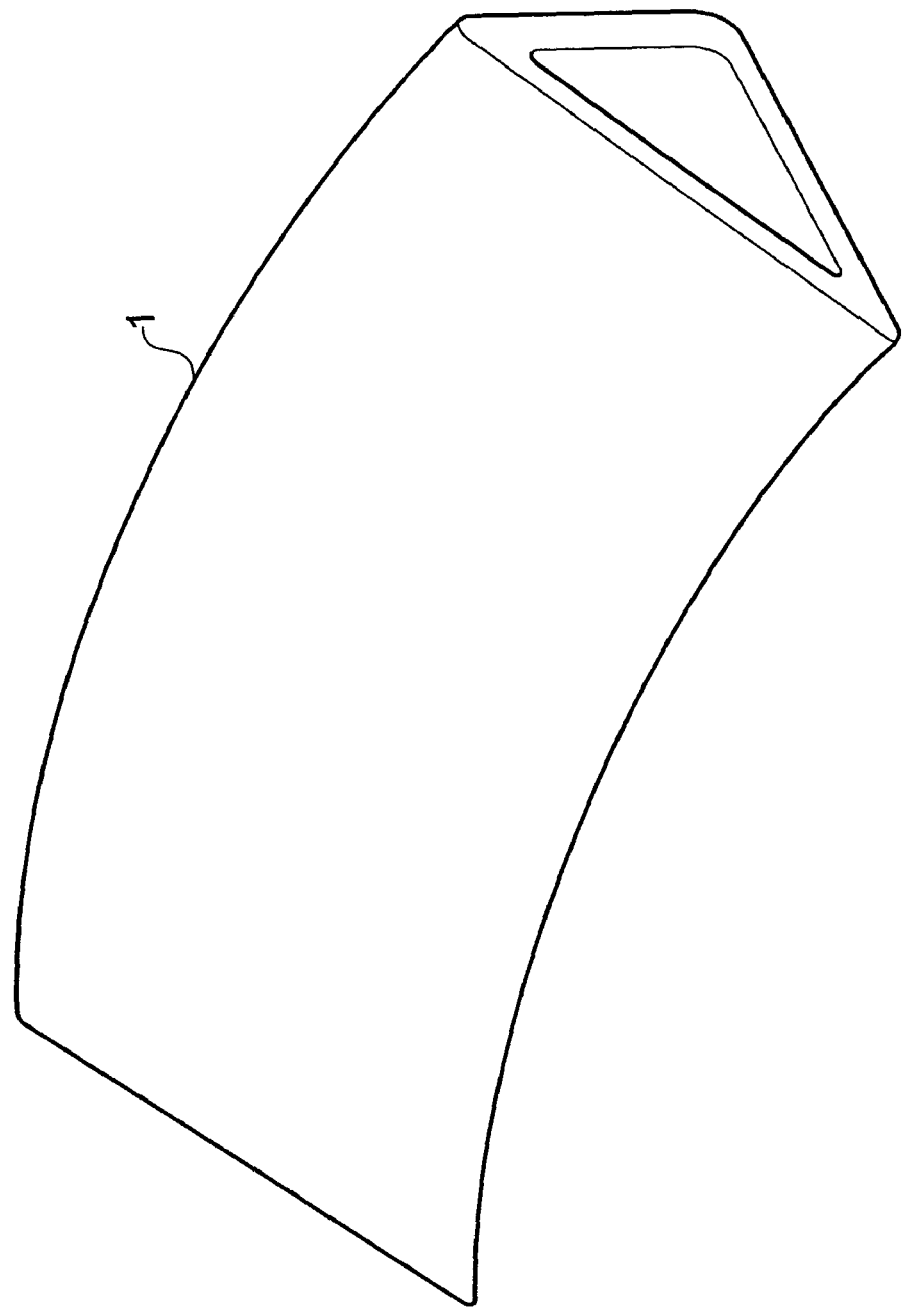
FIG. 1 is a perspective view of a flange element forming an example embodiment of the invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the claimed invention.

DETAILED DESCRIPTION

FIG. 1 shows a perspective view of a hollow curved structure that provides a flange 1 according to an embodiment of the present invention. The flange 1 has a curved surface such that it can be attached to a correspondingly shaped channel or barrel structure, for example to an engine casing. The flange 1 is made of composite material. In this particular example, the flange is made of carbon fibre reinforced composite material for use in aircraft applications.

Figure 2B:
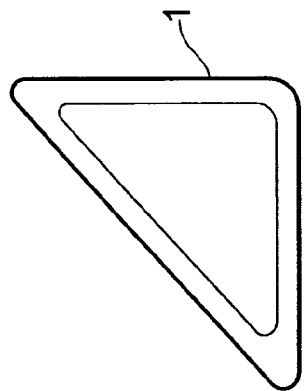
FIG. 2B is a cross-sectional view of part of the flange of FIG. 2A.
Figure 2A:
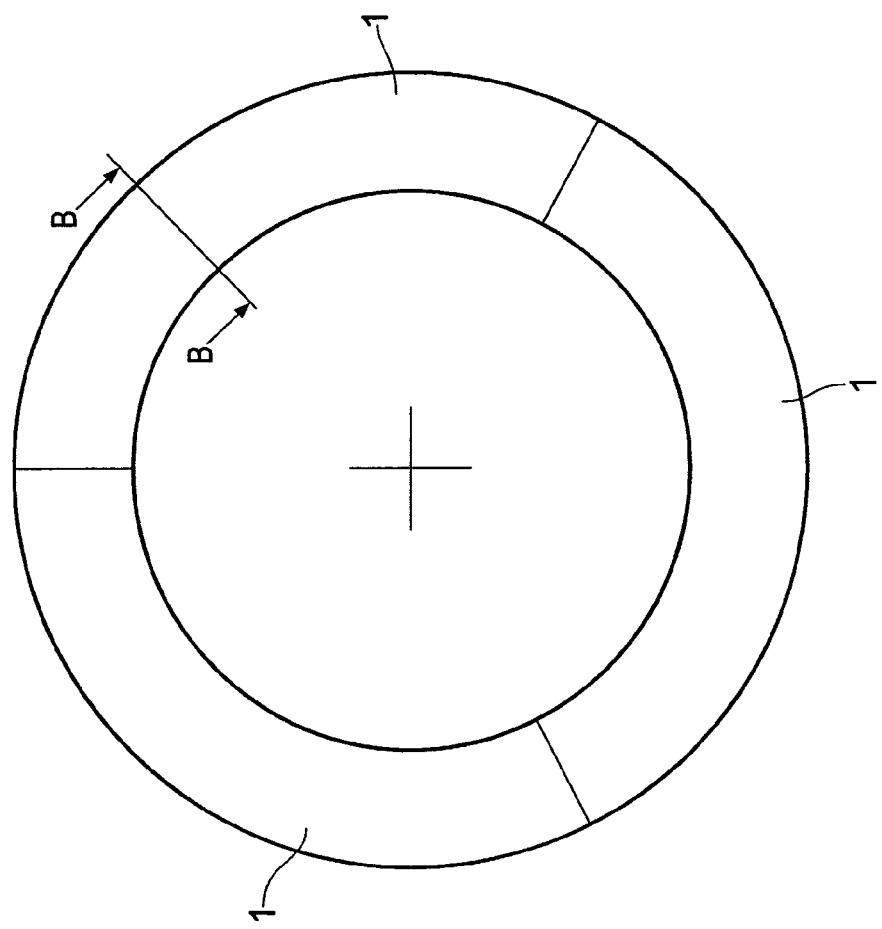
FIG. 2A is schematic representation of three flange elements of FIG. 1 joined together.

FIG. 2A illustrates three flanges elements 1 joined together to form a closed circle. In this particular example, each flange element 1 defines one third of a circle. It will be appreciated that in other examples each flange element may make up another portion of a curved structure, for example one quarter of a curved structure, or some other portion of a curved structure between one quarter and one third of the curved structure, or some other portion. Although FIG. 2A illustrates three flange elements forming approximately equal portions of the curved structure, in other examples a different number of flange elements may be provided and they may form equal or different portions of the curved structure. Although the curved structure represented in FIG. 2A is substantially circular in cross section, in other examples the curved structure could have some other form, for example a closed ellipse, a shape approximating an ellipse or a circle, or a complex curved shape, for example a curved structure that is partially circular but is flattened in parts. Indeed, it is to be noted that FIG. 2A shows a generally circular closed structure for illustrative purposes only and that in other examples other curved structures can be envisaged.

FIG. 2B shows a section through the closed figure in FIG. 2A. The cross-sectional shape of this example of the flange element 1 is a right angled triangle. The triangle, as illustrated in FIG. 2B, has curved vertices due to the manufacturing process for making the flange element 1.

Figure 3:
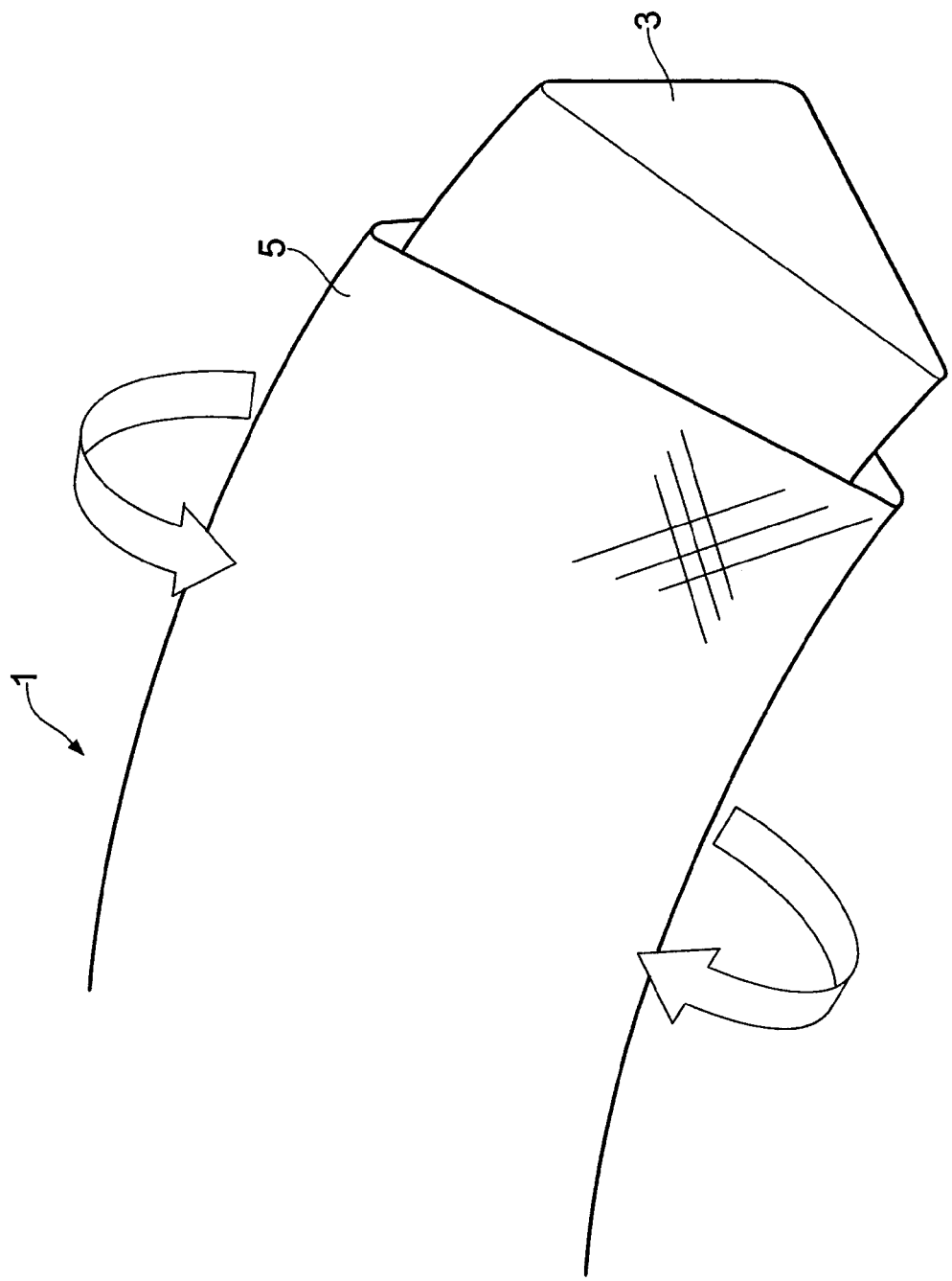
FIG. 3 is a schematic representation of a mandrel and composite material being applied to the mandrel to produce the flange of FIG. 1A.

FIG. 3 represents an example of a manufacturing process for producing an example of the flange element 1. The flange element 1 is made of composite material 5. It will be appreciated that any suitable manufacturing process could be used to produce the flange element 1, for example, filament winding, infusion of 3D woven fabric etc. A mandrel 3 of corresponding triangular cross-section can be used to produce the curved elements or segments of the flange 1. The composite material 5 is applied to the mandrel 3 to produce a composite structure; namely a hollow flange element 1 of triangular cross-section.

Figure 4A:
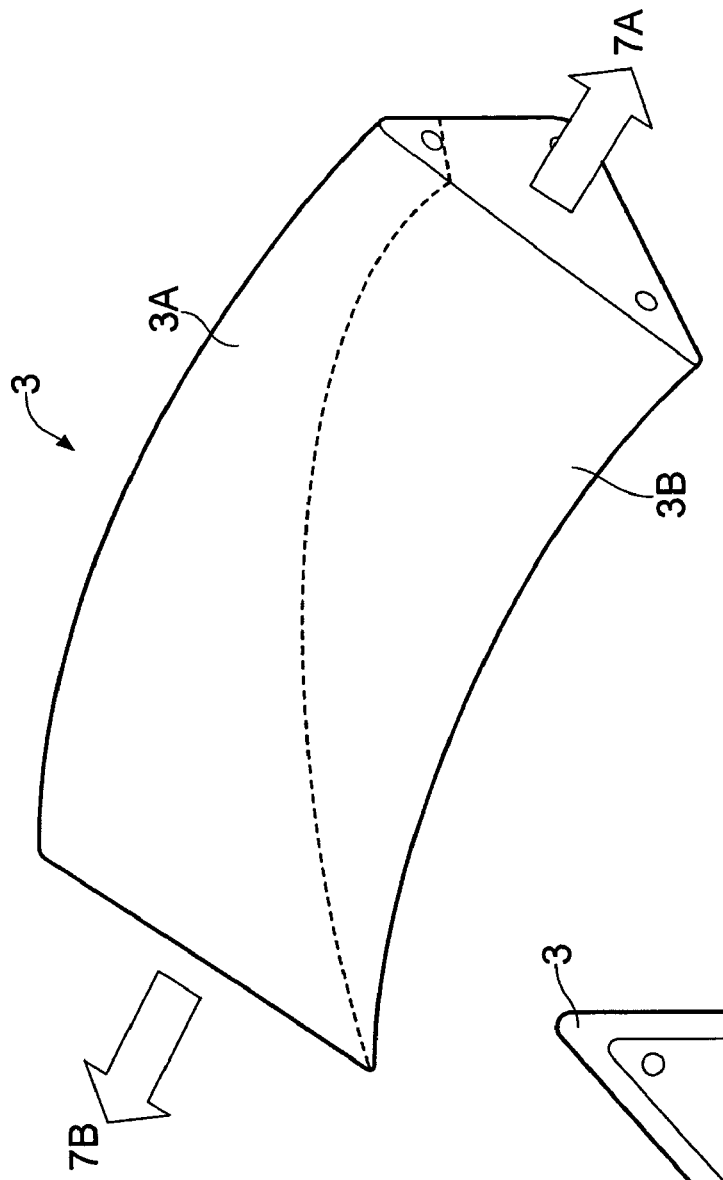
FIG. 4A is a perspective view of a mandrel suitable for making the flange of FIG. 1A.

Referring to FIG. 4A, a mandrel 3 is illustrated that can be assembled to form a curved structure of triangular cross-section and it can be dismantled for removal from the hollow in the flange element 1.

In the example illustrated the mandrel 3 is made up of two mitred sections 3A, 3B. One mitred section 3A sits on top of the other mitred section 3B to produce the solid triangular cross-section about which the composite material is laid to produce the flange 1. To prevent the two parts from moving relative to each other or separating during the manufacturing process an end plate 3C may be attached to one or both ends of the assembled mitred sections 3A, 3B.

Figure 4B:
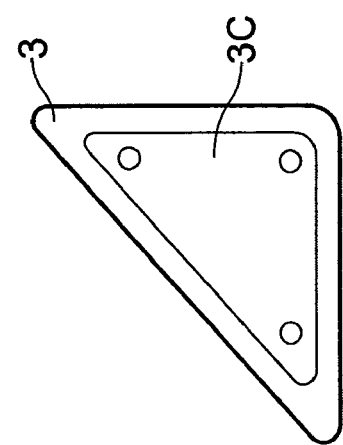
FIG. 4B is an end elevation of the mandrel of FIG. 4A showing an end plate fastened to the mandrel.

FIG. 4B shows one end of the mandrel 3 with an end plate 3C attached. Suitable mechanical fasteners, such as screws, could be used to attach the end plate 3C to the mandrel 3.

The composite material for making the flange element 1 can be wrapped around the mandrel to form the flange element 1 as illustrated in FIG. 3. The material 5 may be wrapped by hand or the process may be automated. The lay-up of the flange element 1 can be selected depending on the particular application. For example, when the flange 1 is destined for use on an engine casing in an aircraft the composite lay-up may comprise layers of longitudinal fibres, where in each layer the orientation of fibres may be aligned at zero degrees, +45 degrees, 90 degrees and −45 degrees. When the desired thickness of laminate is achieved the composite material is cured. The mandrel 3 can be removed after curing the composite material.

To remove the mandrel 3 from the flange element 1, the end plate or end plates 3C, if used, are removed from the mandrel 3 and the two mitred sections 3A, 3B slide relative to each other in the direction of the arrows 7A, 7B such that the two mitred sections 3A, 3B separate and both slide relative to the hollow in the flange element 1 to exit from the flange element 1 to leave a curved hollow of triangular cross-section.

In the example illustrated, the mandrel 3 is made of metal, for example INVAR™, which is a 36 percent iron nickel alloy having a coefficient of thermal expansion of virtually zero or it can be made of composite material. The material for the mandrel 3 is chosen as one that is not affected by the curing temperatures of the composite material such that the integrity of the composite material forming the flange element 1 is not affected during the manufacturing process. The choice of material for the mandrel 3 can be influenced by how easy the mandrel 3 can be removed from the flange element 1 after the flange element 1 is cured. Disassembly of the mandrel 3 when inside the flange element 1 is made easier if the flange material and the material of the mandrel have different coefficients of thermal expansion; this being the case when the flange element 1 is made of a composite material formed from, for example, a composition of one or more resins with fibre reinforcement of, for example glass and/or carbon fibres, and when the mandrel 3 is made of INVAR™.

To further simplify removal of the mandrel 3 from the cured flange element 1, the mandrel 3 may be coated in PTFE. In addition, or alternatively, a releasing agent such as FREKOTE® NC 700, which is a product of Rotafix® that does not affect the composite material may be applied to the surface of the mandrel 3 to make removal from the flange element 1 easier.

Instead of using a mandrel 3 that is dismantled to remove it from the flange, the mandrel could be made, for example, of foam. A foam mandrel could remain inside the flange element 1, because the increase in weight due to the foam is likely to be negligible. Alternatively, a foam mandrel could be removed by dissolving it after curing the flange element 1.

A mandrel made of foam is particularly suited to flanges that have small cross-sectional dimensions. A mandrel made of metal that can be dismantled for removal from the flange element is particularly suited to flanges that have relatively large cross-sectional dimensions.

The flange or flange element 1 is attached to one end or both ends of a structure such as an engine casing and facilitates coupling two such structures together or facilitates attaching such a structure to another structural member.

Figure 5A:
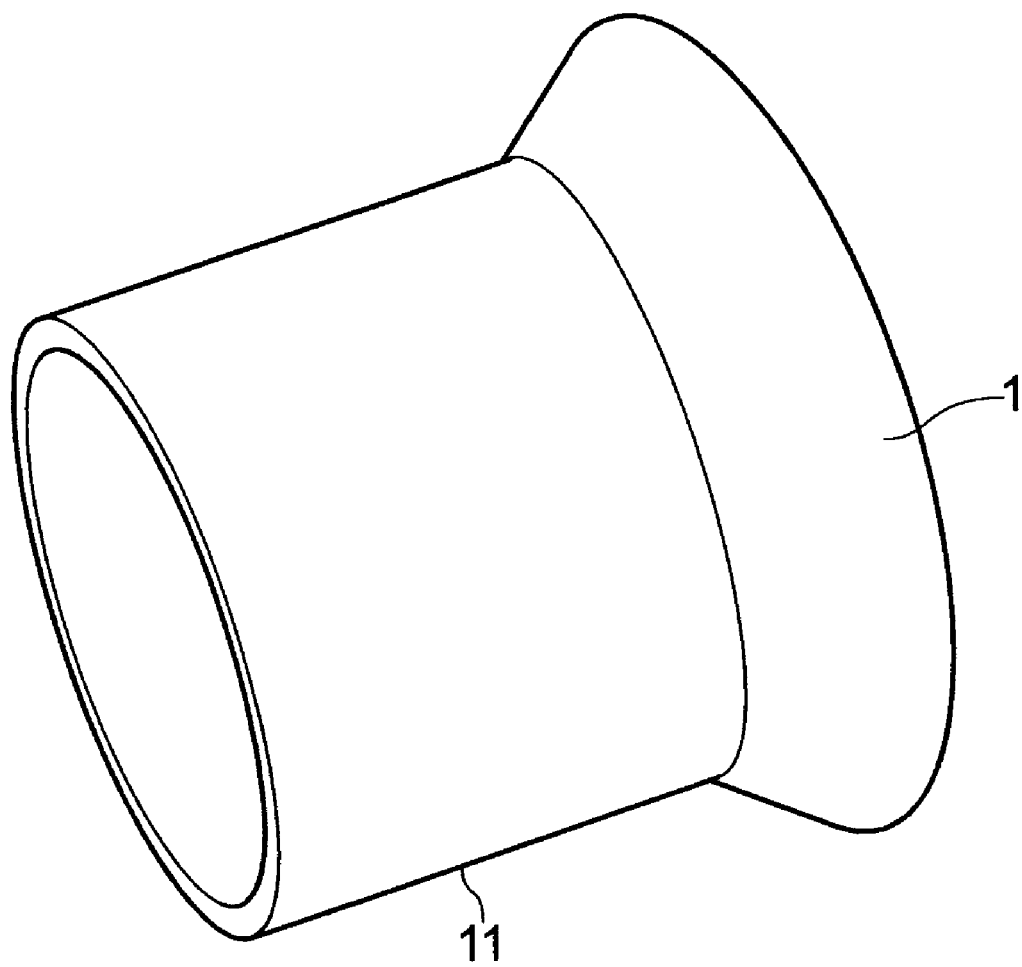
FIG. 5A is a perspective view of a composite duct and a composite flanged joined together.

FIG. 5A shows a perspective view of a cylindrical structure 11, for example an engine casing with a flange 1 attached to one end. The process of attaching the flange 1 to a cylindrical body 11 is described below with reference to FIGS. 5B to 5E.

FIG. 5B shows in cross-section the flange or flange element 1 resting on the outside surface of a cylindrical drum 9 that is made of composite material. The cylindrical drum 11 is laid up on cylindrical forming tool 13. In FIG. 5B the composite material providing the cylindrical drum 11 is indicated by a number of parallel horizontal lines indicating that the structure is made up of laminated plastics material that includes a number of layers. The laminated plastics material in the present example can be a laminated composite material formed, for example, from a composition of one or more resins (for example epoxy or polyester resins) with fibre reinforcement of, for example glass and/or carbon fibres.

The manufacturing process for the cylindrical drum 11 may be any suitable process for making composite materials where the end product has the mechanical properties required for the particular application. The flange element 1 is located at a section 11A away from the end of the drum 11. As shown in FIG. 5C, the end section 11A of the cylindrical drum 11 is darted, wherein each dart 11B can be folded perpendicular to the exterior of the drum 11 as shown in FIG. 5D with little risk of the drum material stretching or tearing.

The darts 11B at the end section 11A of the cylindrical drum 11, as illustrated in FIG. 5D, are folded into contact with the face of the flange 1 that is perpendicular to the axis of the drum 11.

A suitable filler such as adhesive or resin may be applied at the interface of the triangular flange 1 and the cylindrical drum 11. The filler may fill any voids or gaps that may occur due to any surface irregularities present on the mating surfaces of the flange 1 and the drum 11. Filling any voids may be beneficial in improving the integrity of the overall structure.

To improve attachment of the flange 1 to the cylindrical drum 11 composite material 11C is applied to the hypotenuse side of the triangular flange 1 and part of the cylindrical drum 11. However, due to the rounded vertices of the triangular flange 1 a void is likely to be present at the junction of the vertex on the hypotenuse side of the triangular flange and the cylindrical drum 11. To fill the void when overlaying with composite material the fibres could be kinked or damaged. If any gap is left between the flange and the cylindrical drum 11 delamination of the composite material in that region could result if the flange 1 is subject to high enough loads in use. To prevent damage to the overlaying composite material and to prevent a gap being left and to improve the integrity of the finished structure a noodle 15 of filler material, for example foam, is applied at the junction of the hypotenuse of the triangular flange 1 and the outside surface of the cylindrical drum 11 prior to applying the composite material 11C to the hypotenuse side of the triangular flange 1. The composite material 11C overlays part of the cylindrical drum 11, the noodle 15 and part of the hypotenuse side of the triangular flange 1 to attach the flange 1 to the drum 11.

As discussed above, with reference to FIG. 2A, more than one triangular flange element 1 is used to provide a flange 1 around the whole of the perimeter of a closed figure such as a cylindrical engine casing.

Figure 5E:
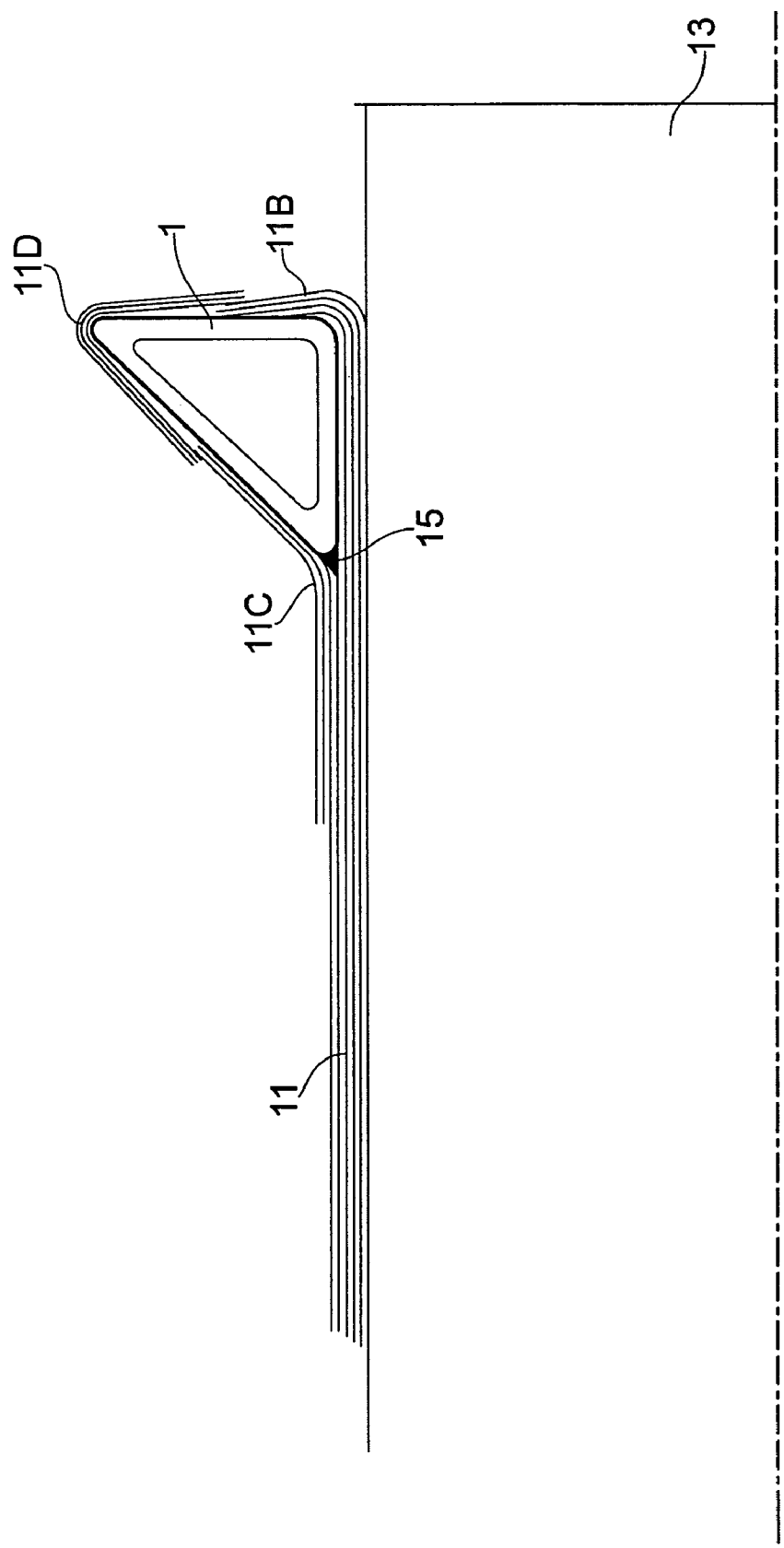
Figure 5F:
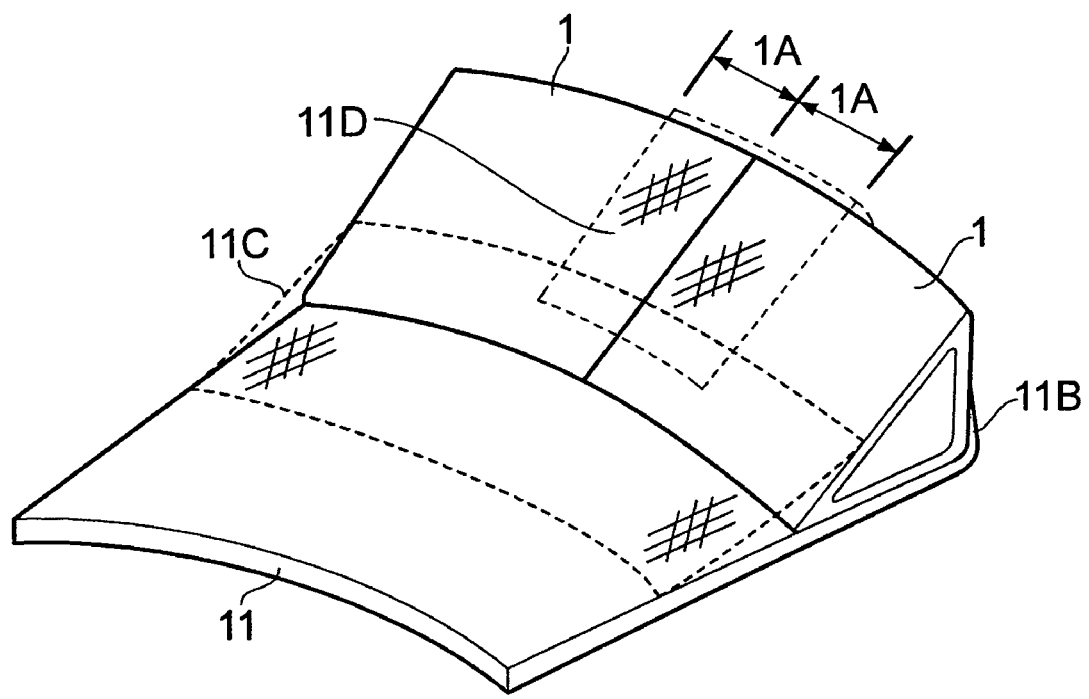

Referring to FIGS. 5E and 5F, additional layers/plies of composite material 11D are applied to the flange elements 1 in the region where two flange elements 1 touch. The composite material 11D that is applied overlaps a section 1A of both flange elements on either side of the join and the composite material 11B, 11C that joins the flange or flange elements 1 to the cylindrical drum 11.

The whole structure is then cured such that the flange 1 and the drum 11 become an integral product such as the example illustrated in FIG. 5A. The combined structure including the flange 1 and the drum 11 may be cured in, for example an autoclave or outside.

For the flange 1 and the drum 11 to become an integral product the composite materials forming the flange 1 and the drum 11 should be the same or at least the composite materials should be chemically and thermally compatible.

Figure 6:
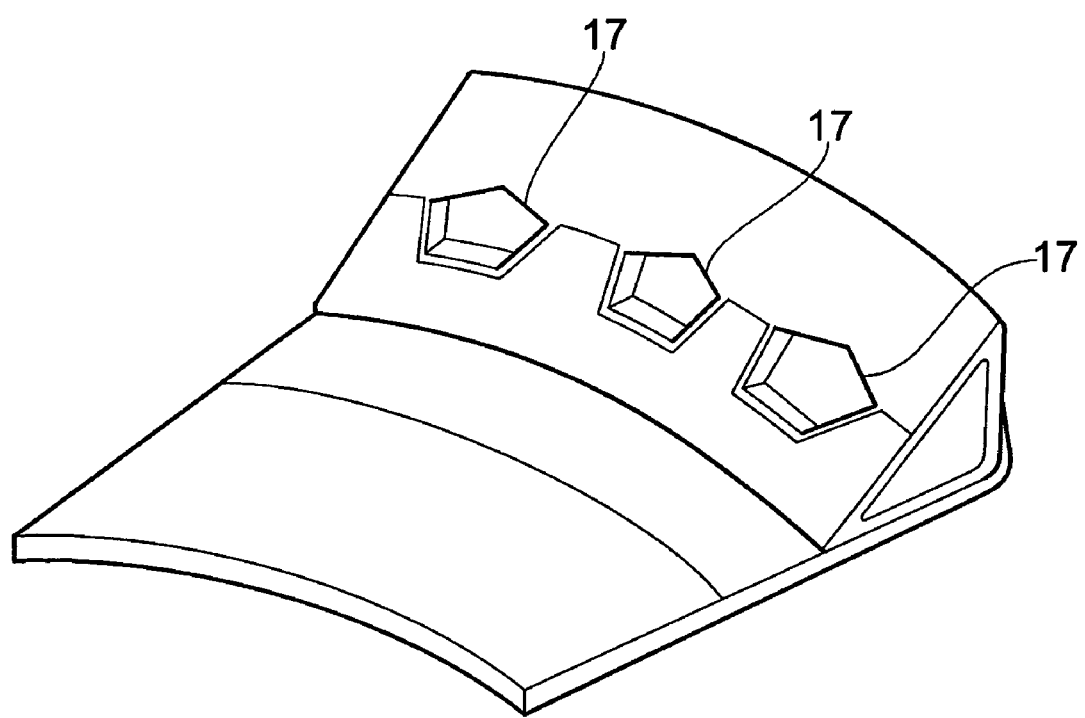
FIG. 6 is a perspective view of part of a cylindrical structure including a flange attached thereto and access holes machined on the flange.

Referring to FIG. 6, a perspective view of part of the combined structure including the flange 1 and the drum 11 is shown, wherein access holes 17 are provided on the hypotenuse side of the triangular flange 1. In this example, the access holes 17 are pentagonal-shaped because the sides of the pentagon 17 align with the orientation of fibres in a laminated structure having layers of fibres orientated at zero degrees, 90 degrees, +45 degrees and −45 degrees. As a result of aligning the sides of the pentagon with the alignment of the fibres there is minimal damage to the integrity of the flange.

The access holes allow access to the mounting surface of the flange 1 where a number of holes (not shown) are drilled to allow connection of the combined structure of the drum 11 and the flange 1 to another structural component.

Reference has been made in the above description to the use of a triangular flange on an engine casing. An example of a use of the triangular flange 1 is in aircraft applications. For example, on a jet engine the composite flange 1 may replace metal flanges at the front and/or rear of the engine housing. Using a composite duct and a composite flange arrangement as discussed above may provide a weight saving and may also reduce the number of parts required compared with a metal housing and flange.

Figure 7:
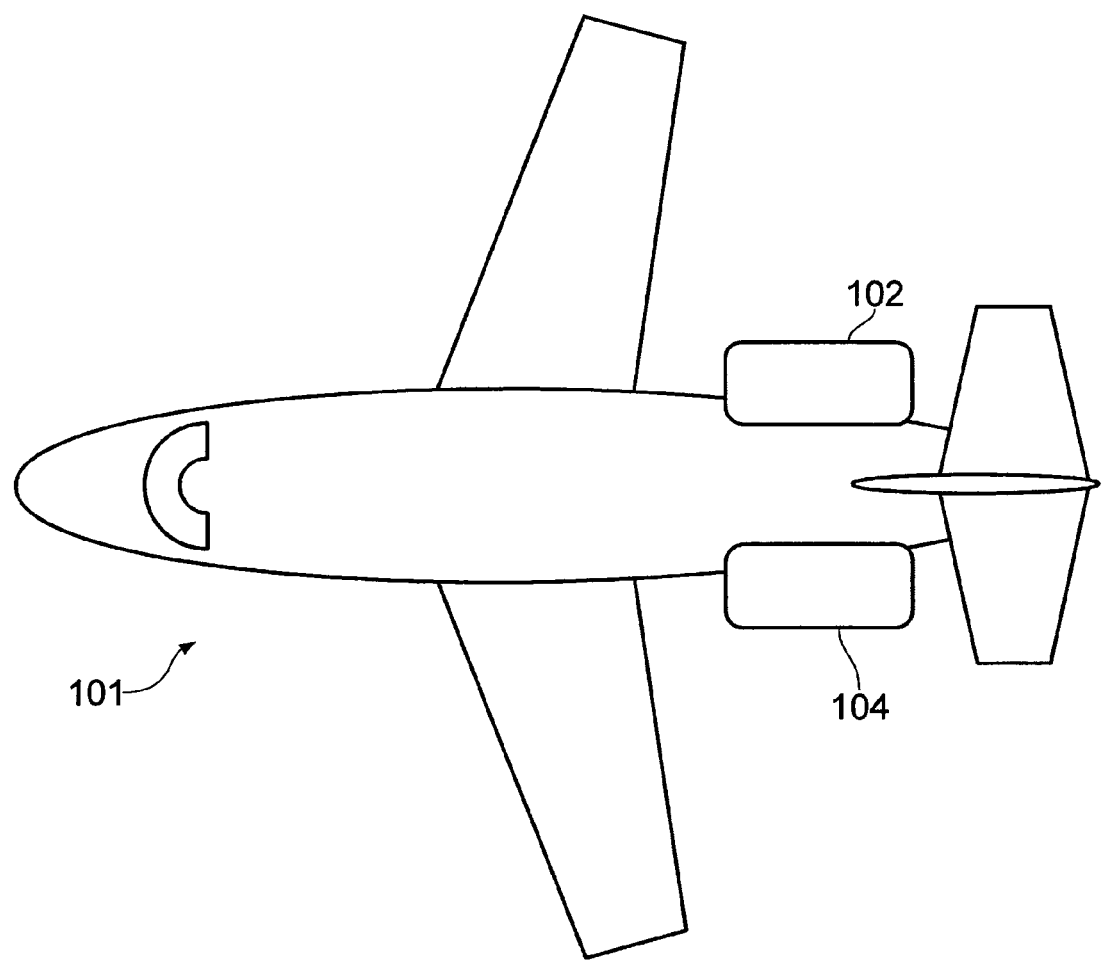
FIG. 7 is a schematic representation of an aircraft incorporating two engines.

For example, FIG. 7 is a schematic representation of an aircraft 100 including first and second engines 102 and 104 housed in engine casings.

Figure 8:
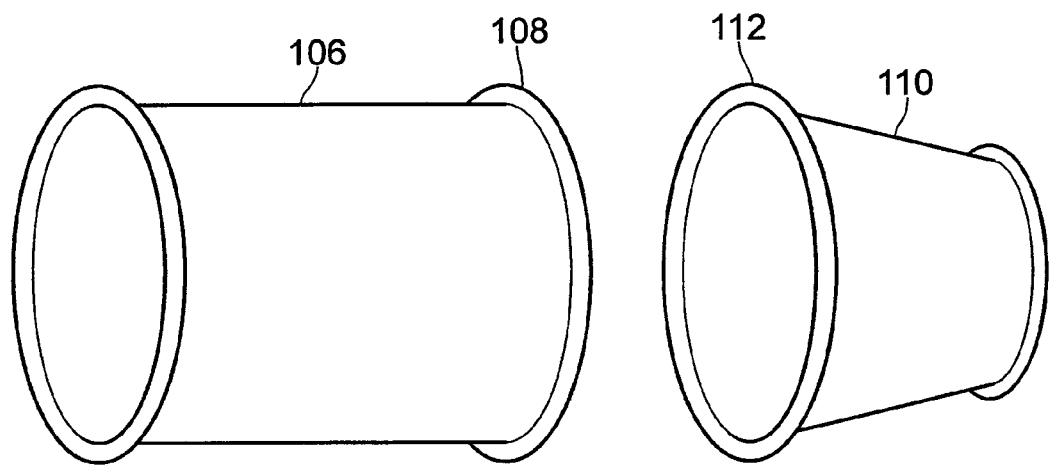
FIG. 8 is a schematic representation of two housing components for an aircraft engine.
Figure 9:
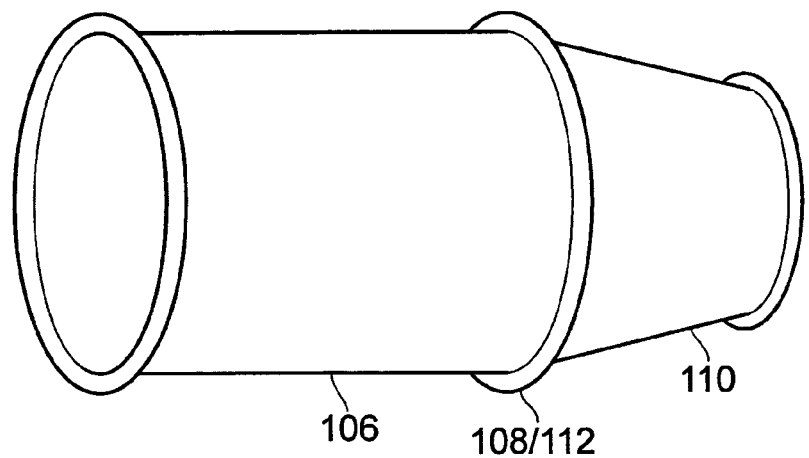
FIG. 9 is a schematic representation of the two parts joined at respective flanges.
Figure 10:
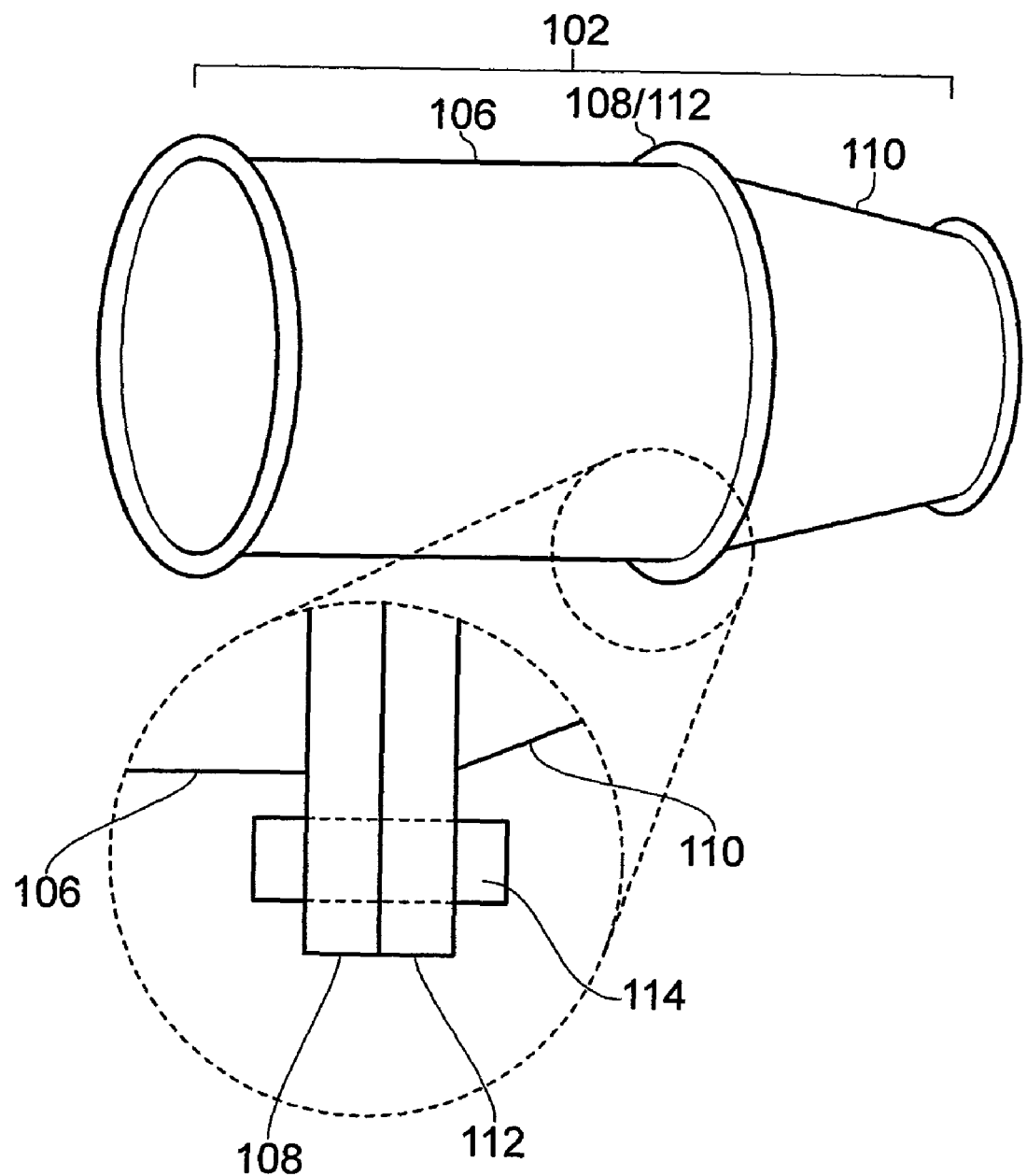
FIG. 10 is a schematic representation of a detail of the joining of the two parts at the flanges.

FIG. 8 is a schematic representation of an outer fan duct of a jet engine such as the engines 102 and 104 that comprises two sections, a first section 106 and a second section 110. The first section 106 is provided with a first flange 108 and the second section 110 is provided with a second flange 112. FIG. 9 illustrates the first section 106 joined to the second section 110 at the flanges 108 and 112. FIG. 10 illustrates this in more detail, in particular in the enlarged view, which shows the first flange 108 of the first section being joined to the second flange 112 of the second portion 110 by means of fastening members 114, which can, for example, be formed by bolts, rivets, etc.

It will be appreciated the representations in FIGS. 7-10 are schematic representations for illustrative purposes only, and that the present invention finds application to forming flanges on curved structures in aircraft and in other applications.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

The invention claimed is:

1. A flange comprising composite material, wherein
   the flange comprises a curved hollow member having a substantially triangular cross-section; and
   said cross-section includes a substantially right-angled triangle, wherein
      a first side of the triangle is substantially perpendicular to a second side of the triangle that follows a curve; and
      a third side of the triangle comprises substantially pentagonal shaped holes.

2. A flange according to claim 1, wherein the curved hollow member defines a section of a closed figure having a curved perimeter.

3. A flange according to claim 2, wherein the section is one quarter to one third of the closed figure having the curved perimeter.

4. A flange according to claim 1, wherein a plurality of the curved hollow members are combined to form a closed figure having a curved perimeter.

5. A flange according to claim 4, wherein the closed figure is a circle.

6. A flange according to claim 4, wherein the closed figure is an ellipse.

7. A flange according to claim 1, comprising fiber reinforced composite material.

8. A flange according to claim 7, wherein the fiber reinforcement is carbon fiber.

9. A flange according to claim 7, wherein the composite material is laminated.

10. A duct comprising composite material including a flange according to claim 1.

11. A duct according to claim 10, wherein the cross-sectional shape of the duct is a closed figure having a curved perimeter.

12. A duct according to claim 10, wherein the duct is an open channel having a curved perimeter.

13. A duct according to claim 10, wherein the material of the duct and the material of the flange are chemically compatible and thermally compatible.

14. A duct according claim 10, wherein the material of the duct and the material of the flange are the same material.

15. An aircraft comprising the duct of claim 10.

16. A method of making a flange comprising composite material, wherein the method comprises the steps of:
   a) applying composite material to external surfaces of a curved mandrel that comprises a substantially triangular cross-section;
   b) curing the composite material to produce a flange comprising a curved hollow member having a substantially triangular cross-section; and
   c) machining substantially pentagonal shaped holes on the face of the flange corresponding to the hypotenuse side of the substantially triangular cross-section, wherein the sides of the pentagonal shaped holes are arranged to align with fibers in the composite material comprising the flange.

17. A method according to claim 16, further comprising the step of: d) removing the mandrel from the hollow member.

18. A method according to claim 17, wherein the mandrel can be dismantled and removal of the mandrel comprises dismantling the mandrel.

19. A method according to claim 18, wherein the mandrel comprises two or more parts which are assembled to form a substantially triangular cross-section, wherein the two or more parts are dismantled for removal from the hollow member.

20. A method according to claim 19, wherein the mandrel comprises two or more segments which are dismantled by sliding segments relative to each other.

21. A method according to claim 18, wherein the mandrel comprises a plurality of tessellating sections that join together to provide the mandrel a substantially triangular cross-section when assembled and separate for removal from the hollow member.

22. A method according to claim 16, wherein the mandrel is made of soluble material that is dissolved to remove the mandrel from the formed hollow member.

23. A method of making a structure comprising composite material, wherein the method comprises providing a duct of composite material with a flange of composite material, wherein the flange is produced from the method according to claim 16, further comprising the step of attaching the flange to at least an end of the duct.

24. A method according to claim 23, wherein an end section of the material of the duct is darted to allow the material to fold into contact with one side of the flange; applying the flange to the surface of the duct proximate the darting; folding the darted section of the composite material making the duct into contact with the side of the flange to attach the flange to the duct.

25. A method according to claim 24, further comprising the steps of: applying filler at the junction of a vertex of the triangular cross-section provided by a surface of the flange in contact with the duct and a hypotenuse side of the triangular cross-section; and adding plies of composite material to overlay the duct, the filler and at least part of the hypotenuse side of the triangular cross-section.

26. A method according to claim 24, including the step of bagging the structure and curing the composite material providing the structure.

27. A method according to claim 26, further comprising machining fixing holes on exposed faces of the flange and wherein the substantially pentagonal shaped holes are access holes.

28. A mandrel for use in the method of making a flange according to claim 16, wherein the mandrel is curved and comprises a solid triangular cross-section.

29. A mandrel according to claim 28, wherein the mandrel comprises two or more parts configured to be assembled together to provide the substantially triangular cross-section.

30. A mandrel according to claim 29, wherein two segments comprising mitred surfaces are arranged one on top of the other to provide the curved member having a substantially triangular cross section.

31. A mandrel according to claim 30, further comprising one or more end plates attachable to one or both ends of the segments.

32. A mandrel according to claim 28, wherein the mandrel is made of iron nickel alloy.

33. A mandrel according to claim 28, wherein the mandrel is made of composite material.

34. A mandrel according claim 28, wherein the mandrel is coated with a release agent.

35. A mandrel according to claim 28, wherein the mandrel is coated with PTFE.

* * * * *

UNITED STATES PATENT AND TRADEMARK OFFICE
CERTIFICATE OF CORRECTION

PATENT NO. : 8,393,648 B2  
APPLICATION NO. : 12/663084  
DATED : March 12, 2013  
INVENTOR(S) : Giovanni Antonio Marengo Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

First Day of September, 2015

Michelle K. Lee
*Director of the United States Patent and Trademark Office*